(12) United States Patent
Uwai et al.

(10) Patent No.: US 11,941,199 B2
(45) Date of Patent: Mar. 26, 2024

(54) ELECTRONIC APPARATUS AND METHOD OF CONTROLLING ELECTRONIC APPARATUS

(71) Applicant: PANASONIC INTELLECTUAL PROPERTY MANAGEMENT CO., LTD., Osaka (JP)

(72) Inventors: Shuto Uwai, Kanagawa (JP); Tomoki Takano, Kanagawa (JP); Yusaku Shoda, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/104,470

(22) Filed: Feb. 1, 2023

(65) Prior Publication Data
US 2023/0244336 A1 Aug. 3, 2023

(30) Foreign Application Priority Data
Feb. 2, 2022 (JP) .................................. 2022-014933

(51) Int. Cl.
*G06F 3/041* (2006.01)
*G06F 3/147* (2006.01)

(52) U.S. Cl.
CPC ............ *G06F 3/0412* (2013.01); *G06F 3/147* (2013.01); *H04B 5/70* (2024.01)

(58) Field of Classification Search
CPC ...... G06F 3/0412; G06F 3/147; H04B 5/0025
USPC .......................................................... 345/173
See application file for complete search history.

(56) References Cited

U.S. PATENT DOCUMENTS

| | | | |
|---|---|---|---|
| 2014/0253963 A1 | 9/2014 | Aoyama | |
| 2017/0371491 A1* | 12/2017 | Horikoshi | G06F 3/0418 |
| 2018/0046269 A1* | 2/2018 | Kaplan | G06F 1/3259 |
| 2021/0058112 A1* | 2/2021 | Huang | H04B 5/0012 |

FOREIGN PATENT DOCUMENTS

| | | |
|---|---|---|
| JP | 2008-028910 | 2/2008 |
| JP | 2014-170443 | 9/2014 |
| JP | 2017-188147 | 10/2017 |
| JP | 2017-202600 | 11/2017 |
| JP | 2017-228173 | 12/2017 |
| JP | 2021-157421 | 10/2021 |

* cited by examiner

*Primary Examiner* — Calvin C Ma
(74) *Attorney, Agent, or Firm* — GREENBLUM & BERNSTEIN, P.L.C.

(57) ABSTRACT

An electronic apparatus includes a touch panel with a detection function, an antenna for near field communication, a proximity sensor configured to detect proximity of a communication medium and located near the touch panel, and a processor. In a case that the proximity sensor detects the proximity of the communication medium for communicating with the antenna, the processor sets an operating mode of the electronics apparatus to a near field communication mode for a wireless transmission by the antenna and stops the detection function of the touch panel.

9 Claims, 8 Drawing Sheets

ELECTRONIC APPARATUS AND METHOD OF CONTROLLING ELECTRONIC APPARATUS

CROSS-REFERENCE TO RELATED APPLICATIONS

This application is based on and claims priority under 35 USC 119 from Japanese Patent Application No. 2022-014933 filed on Feb. 2, 2022, the contents of which are incorporated herein by reference.

TECHNICAL FIELD

The present disclosure relates to an electronic apparatus and a method of controlling the electronic apparatus.

BACKGROUND ART

A touch panel that detects an input operation by an indicator such as a finger is known in the related art. The touch panel is generally attached to a display device of an electronic apparatus. Thus, the touch panel provides a user interface of the electronic apparatus. Examples of the touch panel include a resistive film touch panel and an electrostatic capacitance touch panel.

On the other hand, with the spread of near field communication (NFC) in recent years, an electronic apparatus is proposed, which employs an electrostatic capacitance touch panel device, detects a wireless communication device such as a non-contact IC card or a radio frequency identification (RFID) tag, and performs wireless communication with the detected wireless communication device.

JP-2021-157421A discloses a technique of, in a touch screen of a display device, forming an antenna on a touch screen surface by connecting a plurality of conductive patterns formed simultaneously with wirings forming the touch screen.

In the electronic apparatus described above, a communication antenna for near field communication is generally disposed on a back surface of a touch panel or a display device from a viewpoint of saving arrangement space. In such a configuration, the touch panel is disposed between the communication antenna and a communication medium such as a non-contact IC card close to the electronic apparatus. For this reason, magnetic flux disturbance of wireless communication, scan noise, and the like may have an influence on the touch panel, and the touch panel may malfunction.

SUMMARY OF INVENTION

The present disclosure provides an electronic apparatus and a method of controlling an electronic apparatus that can prevent electrical interference between near field communication and a touch panel of the electronic apparatus and prevent malfunction of the touch panel.

According to an aspect of the present disclosure, there is provided an electronic apparatus including: a touch panel with a detection function, an antenna for near field communication, a proximity sensor configured to detect proximity of a communication medium and located near the touch panel, and a processor, in which in a case that the proximity sensor detects the proximity of the communication medium for communicating with the antenna, the processor sets an operating mode of the electronics apparatus to a near field communication mode for wireless transmission by the antenna and stops the detection function of the touch panel.

Also, according to an aspect of the present disclosure, there is provided a method of controlling an electronic apparatus including a touch panel with a detection function, an antenna for near field communication, a proximity sensor configured to detect proximity of a communication medium and located near the touch panel, and a processor, the method including: setting an operating mode of the electronics apparatus to a near field communication mode for wireless transmission by the antenna in a case that the proximity sensor detects proximity of the communication medium for communicating with the antenna, and stopping the detection function of the touch panel in a case that the near field communication mode is set.

According to the present disclosure, electrical interference between the near field communication and the touch panel can be prevented, and malfunction of the touch panel can be prevented.

BRIEF DESCRIPTION OF DRAWINGS

Exemplary embodiments of the present invention will be described in detail based on the following figures, wherein.

DESCRIPTION OF EMBODIMENTS

Hereinafter, embodiments specifically disclosing an electronic apparatus and a touch panel control method according to the present disclosure will be described in detail with reference to the drawings appropriately. Unnecessary descriptions in detail may be omitted. For example, detailed descriptions of a well-known matter and repeated descriptions of substantially the same configuration may be omitted. This is to avoid unnecessary redundancy in the following description and to facilitate understanding of those skilled in the art. The accompanying drawings and the following descriptions are provided for those skilled in the art to fully understand the present disclosure, and are not intended to limit a subject matter of the claims.

Figure 1:
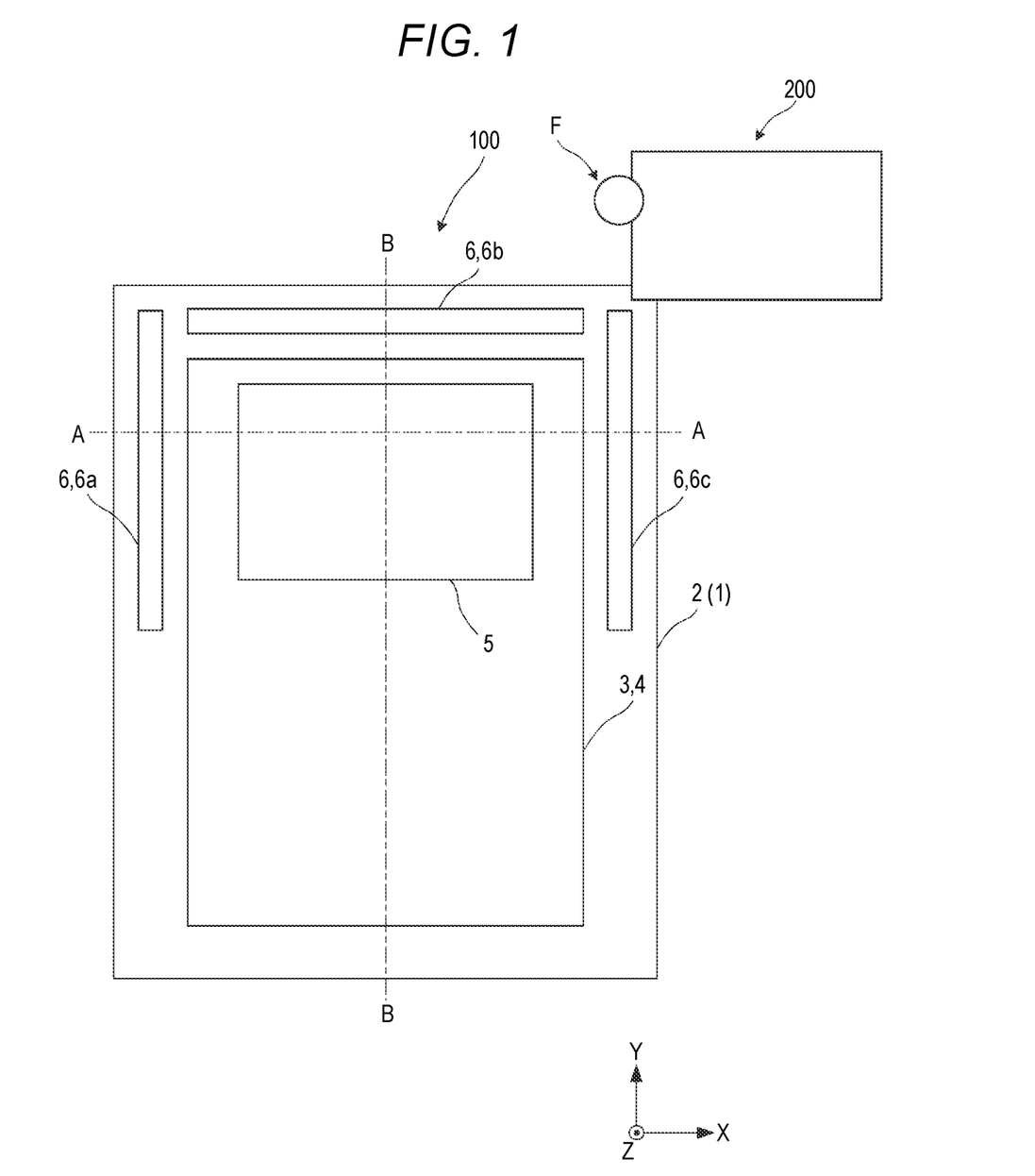
FIG. 1 is an overall configuration view of an electronic apparatus having a touch panel according to an embodiment of the present disclosure.
Figure 2A:
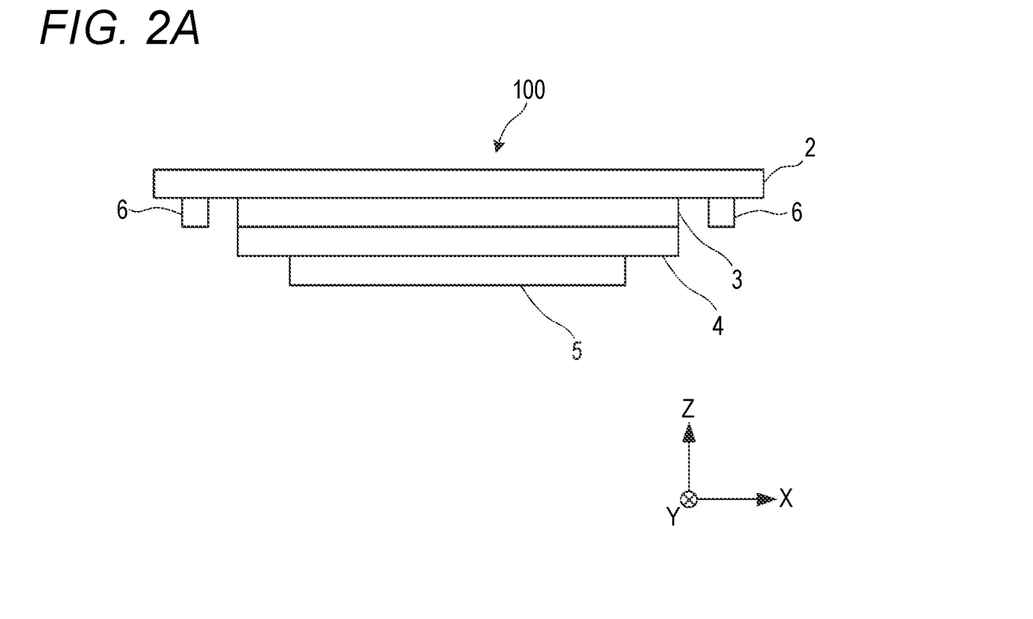
FIG. 2A is a cross-sectional view taken along a line A-A in FIG. 1.
Figure 2B:
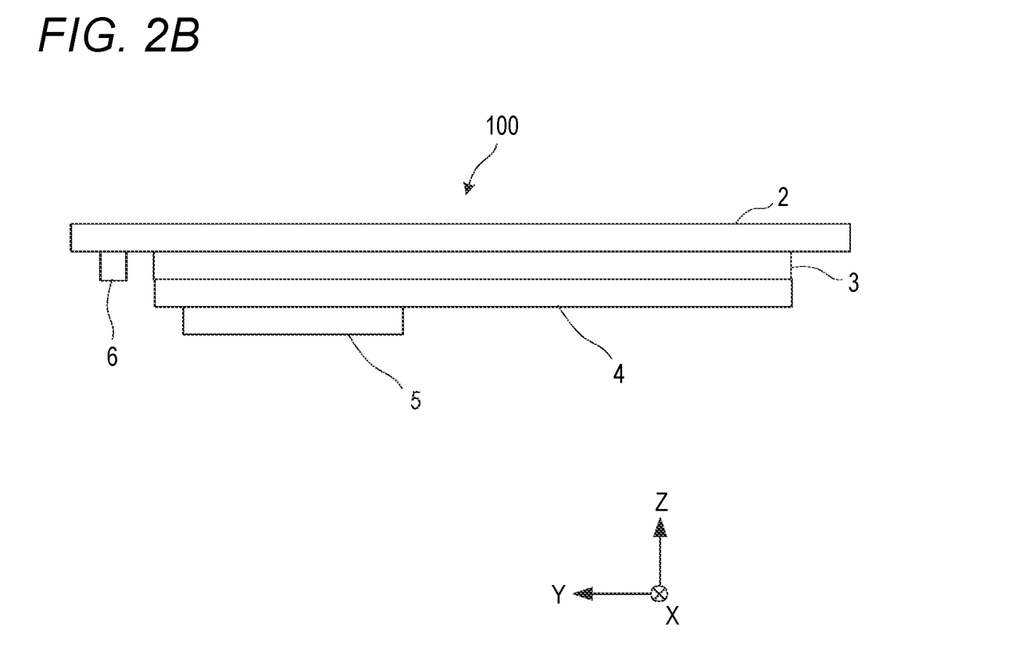
FIG. 2B is a cross-sectional view taken along a line B-B in FIG. 1.

FIG. 1 is an overall configuration view of an electronic apparatus including a touch panel according to an embodiment of the present invention. FIG. 2A is a cross-sectional view taken along a line A-A in FIG. 1. FIG. 2B is a cross-sectional view taken along a line B-B in FIG. 1. In the drawings, an X direction is a direction (for example, lateral direction) along a touch panel surface, and a Y direction is a direction along the touch panel surface and perpendicular to the X direction. A Z direction is a direction perpendicular to the touch panel surface.

An electronic apparatus 100 includes a housing 1, a protective plate 2, a touch panel 3, a liquid crystal display (LCD) module 4, a NFC antenna 5, and a proximity sensor 6. The electronic apparatus 100 is, for example, a settlement processing apparatus that performs settlement processing.

The housing 1 constitutes an exterior of the electronic apparatus 100 and houses other components. In FIGS. 2A and 2B, only the protective plate 2 is shown, and the housing 1 is omitted. The protective plate 2 is disposed above the touch panel 3 and protects the touch panel 3.

The touch panel 3 provides a user interface that detects an input operation by a finger of a user or an indicator such as a stylus pen. Examples of the touch panel 3 include various types of touch panels such as a resistive film touch panel and an electrostatic capacitance touch panel, and the type of the touch panel 3 is not particularly limited.

The LCD module 4 is a so-called liquid crystal display device, and includes various elements such as a liquid crystal cell and a polarizing plate, and the type of the LCD module 4 is not particularly limited. Another display device (for example, organic electroluminescence) may be used instead of the LCD module 4.

The NFC antenna 5 is a communication antenna for near field communication (near field communication antenna). The NFC antenna 5 detects a communication medium such as a non-contact IC card or a high-frequency identification device tag by near field communication, and performs wireless communication with the detected communication medium. The NFC antenna 5 performs near field communication with, for example, a NFC card 200, which is a communication medium close to the electronic apparatus 100, and exchanges information with the NFC card 200. The NFC card 200 is, for example, an IC card. That is, the electronic apparatus 100 may read information of the NFC card 200 or write information in the NFC card 200 via the NFC antenna 5. In the present embodiment, the NFC card 200 is mainly exemplified as a communication medium.

In FIG. 1, the user holds the NFC card 200 capable of communicating with the NFC antenna 5 with a finger F and brings the NFC card 200 close to the electronic apparatus 100. The electronic apparatus 100 may be a fixed apparatus (stationary) or a portable apparatus (portable or handheld). Further, the NFC card 200 may be integrated in a fixed apparatus, and the portable electronic apparatus 100 may be brought close to the part of the NFC card 200 by the user. The electronic apparatus 100 may have a size similar to that of a smartphone, for example.

The proximity sensor 6 is provided around the NFC antenna 5 in the vicinity of the touch panel 3, and detects proximity of an object. Examples of the proximity sensor 6 include various types of sensors such as an electrostatic capacitance sensor, a photoelectric sensor, and an ultrasonic sensor. However, the type of the proximity sensor 6 is not particularly limited.

In the electronic apparatus 100 as shown in FIG. 1, the housing 1 has a rectangular shape in a plan view in many cases, and the NFC antenna 5 also has a rectangular shape in a plan view. As the proximity sensor 6, for example, three proximity sensors 6 (6a, 6b, 6c) are disposed along three respective sides of the NFC antenna 5 having a rectangular shape in a plan view. Each of the three proximity sensors 6 detects proximity of the object. In FIG. 1, the NFC antenna 5 is disposed close to a positive side in the Y direction in a plan view. Therefore, the three proximity sensors 6 (6a, 6b, 6c) are also disposed close to the positive side in the Y direction. Therefore, for example, the electronic apparatus 100 can detect that the NFC card 200 overlaps with a half of the housing 1 of the small electronic apparatus 100 on the positive side in the Y direction by the three proximity sensors 6. A negative side in the Y direction where the NFC antenna 5 is not present is a place where the electronic apparatus 100 is usually held by a user.

As shown in FIGS. 2A and 2B, the protective plate 2, the touch panel 3, the LCD module 4, and the NFC antenna 5 are arranged in this order from a positive side (upper side) in the Z direction. The proximity sensors 6 are provided outside the touch panel 3 on a negative side (lower side) of the protective plate 2 in the Z direction.

Figure 3:
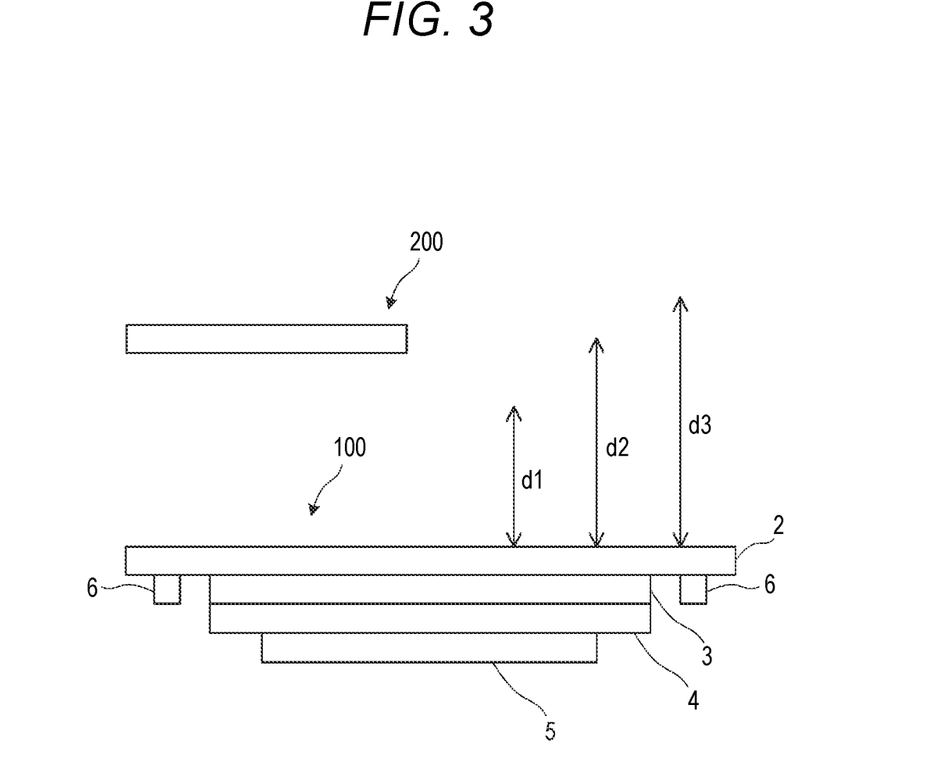
FIG. 3 is a cross-sectional view showing a relative positional relationship between the electronic apparatus and a NFC card.

FIG. 3 is a cross-sectional view showing a relative positional relationship between the electronic apparatus 100 and the NFC card 200. In the present embodiment, a communicable distance d1, a touch panel interference distance d2, and an object detection distance d3 are defined as one index indicating a relative positional relationship between the electronic apparatus 100 and another object.

The communicable distance d1 is a distance at which the NFC antenna 5 can conduct near field communication with the NFC card 200. The touch panel interference distance d2 is a distance at which the near field communication between the NFC antenna 5 and the NFC card 200 electrically interferes with detection by the touch panel 3. The object detection distance d3 is a distance at which the object can be detected by the proximity sensors 6. As is clear from FIG. 3, the touch panel interference distance d2 is set to be longer than the communicable distance d1 and smaller than the object detection distance d3 (d1<d2<d3).

An object is determined to be in proximity by the proximity sensors 6 in a case that a distance between the proximity sensors 6 (electronic apparatus 100) and the object is equal to or less than the object detection distance d3. On the other hand, the object is determined to be not in proximity by the proximity sensors 6 in a case that the distance between the proximity sensors 6 (electronic apparatus 100) and the object is longer than the object detection distance d3.

Figure 4:
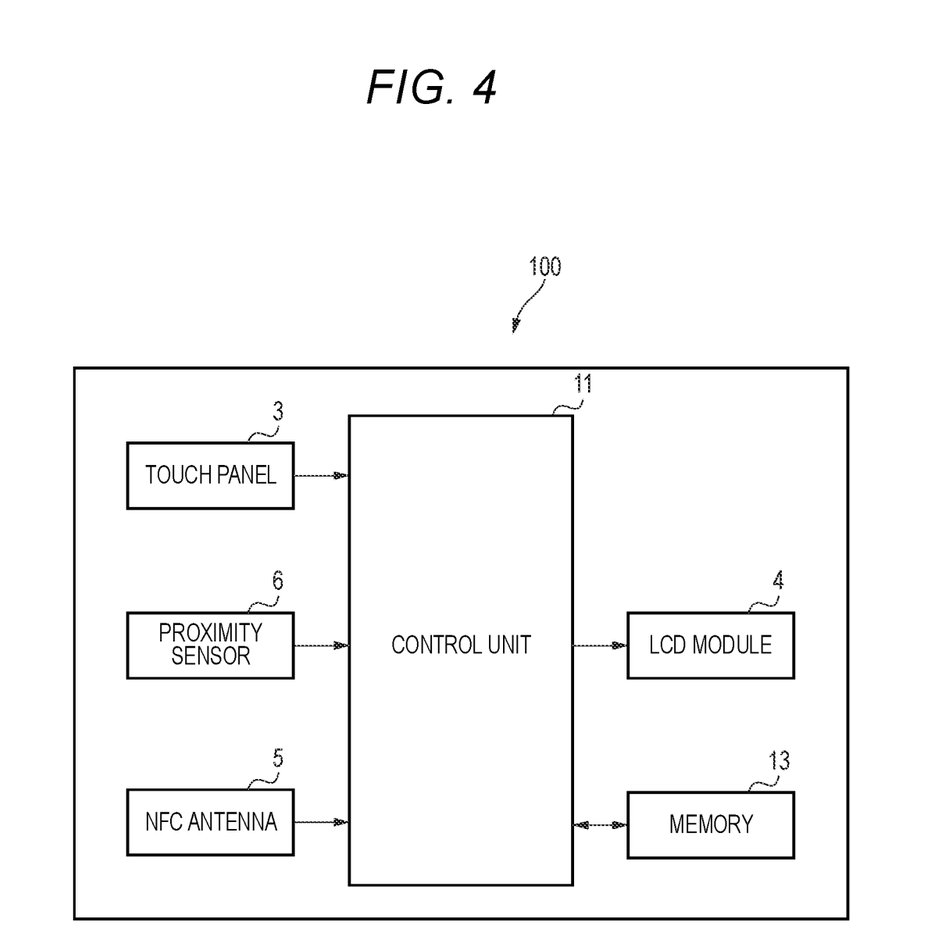
FIG. 4 is a block diagram showing a configuration example of the electronic apparatus.

FIG. 4 is a block diagram showing a configuration example of the electronic apparatus 100. The electronic apparatus 100 includes the touch panel 3, the LCD module 4, the NFC antenna 5, the proximity sensor 6, a control unit 11, and a memory 13.

The control unit 11 includes, for example, a processor. The processor implements various functions of the control unit 11 by executing a program held in the memory 13. The processor may include a micro processing unit (MPU), a central processing unit (CPU), a digital processor (DSP), or the like. The processor may be implemented by various integrated circuits (for example, large scale integration (LSI), field programmable gate array (FPGA)). The control unit 11 integrally controls units of the electronic apparatus 100 and performs various types of processing.

The memory 13 stores various data, information, programs, and the like. The memory 13 includes a primary storage device (for example, random access memory (RAM), read only memory (ROM)), and is, for example, a flash memory. The memory 13 may include a memory other than the primary storage device.

The control unit 11 may confirm a detection state of one or more proximity sensors 6 and determine the presence or absence of an object in proximity to the proximity sensors 6 (electronic apparatus 100) or the type of the object in proximity to the proximity sensors 6. For example, the control unit 11 determines proximity of an object in a case that proximity of the object is detected by at least one proximity sensor 6. For example, the control unit 11 determines detection of proximity of an indicator (for example, finger F) in a case that proximity of an object is detected by one proximity sensor 6 instead of a plurality of proximity sensors 6. For example, the control unit 11 determines detection of proximity of the NFC card 200 instead of the indicator in a case that proximity of an object is detected by at least two proximity sensors 6 (for example, all of three proximity sensors 6).

Further, the control unit 11 may control to execute or not execute the detection by the touch panel 3, to stop the detection or to cancel the stop of the detection, and the like in accordance with the state of the near field communication by the NFC antenna 5 and the positional relationship between the NFC antenna 5 and the NFC card 200.

For example, in a case that the NFC antenna 5 is in near field communication, or in a case that proximity of the NFC card 200 capable of communicating with the NFC antenna 5 is detected by the proximity sensor 6, the control unit 11 may control to stop the detection by the touch panel 3. In this case, in a case that there is possibility that near field communication is started between the NFC antenna 5 and the NFC card 200, the electronic apparatus 100 can prevent electrical interference between the near field communication and the detection by the touch panel 3 by stopping a detection operation of the touch panel 3.

For example, in a case that the NFC antenna 5 is not in near field communication, or in a case that no proximity of the NFC card 200 capable of communicating with the NFC antenna 5 is detected by the proximity sensor 6, the control unit 11 may control to execute the detection by the touch panel 3. In this case, it is estimated that no near field communication is started between the NFC antenna 5 and the NFC card 200, and thus the electronic apparatus 100 can prevent electrical interference between the near field communication and the detection by the touch panel 3 even when the detection operation of the touch panel 3 is performed.

For example, the control unit 11 may control to cancel the stop of the detection by the touch panel 3 in a case that the proximity sensor 6 changes from a state in which proximity of an object is detected by the proximity sensor 6 to a state in which no proximity of an object is detected by the proximity sensor 6. In this case, the electronic apparatus 100 can resume the detection by the touch panel 3 on an assumption that the near field communication ended, and can prevent electrical interference between the near field communication and the detection by the touch panel 3.

The control unit 11 sets an operation mode of the electronic apparatus 100. The operation mode of the electronic apparatus 100 includes at least a NFC mode which enables NFC communication and a non-NFC mode which disables NFC communication. In the NFC mode, the NFC antenna 5 performs polling for near field communication and transmits radio waves. In the non-NFC mode, the NFC antenna 5 does not perform polling for near field communication and does not transmit radio waves. Setting information on the operation mode is stored in the memory 13.

Even when the NFC antenna 5 performs polling, the electronic apparatus 100 can prevent electrical interference between the near field communication and the touch panel 3 and prevent malfunction of the touch panel 3 simply by not conducting near field communication with the NFC card 200. Further, the electronic apparatus 100 can prevent electrical interference between the near field communication and the touch panel 3 and further prevent malfunction of the touch panel 3 by setting the communication mode to the non-NFC mode and does not perform polling.

Further, the control unit 11 may cancel the stop of the detection by the touch panel 3 in a case that the distance between the NFC antenna 5 and the NFC card 200 changes from being less than the communicable distance d1 to being longer than the communicable distance d1, that is, in a case that the near field communication between the NFC antenna 5 and the NFC card 200 ended. Further, the control unit 11 may cancel the stop of the detection by the touch panel 3 after the distance between the NFC antenna 5 and the NFC card 200 increases and is longer than the object detection distance d3 and the NFC card 200 cannot be detected by the proximity sensor 6. In this case, since the NFC card 200 is not present within the touch panel interference distance d2 less than the object detection distance d3, the electrical interference between the NFC card 200 and the touch panel 3 can be prevented and the malfunction of the touch panel 3 can be more reliably prevented. The malfunction of the touch panel 3 is, for example, erroneous detection of an input by the touch panel 3, and may be detection of information that was not input or failure in detecting information that was input. Further, the detection by the touch panel 3 can be automatically resumed without operation of the user, thus improving the convenience of the user.

Next, operation examples of the electronic apparatus 100 will be described.

Figure 5:
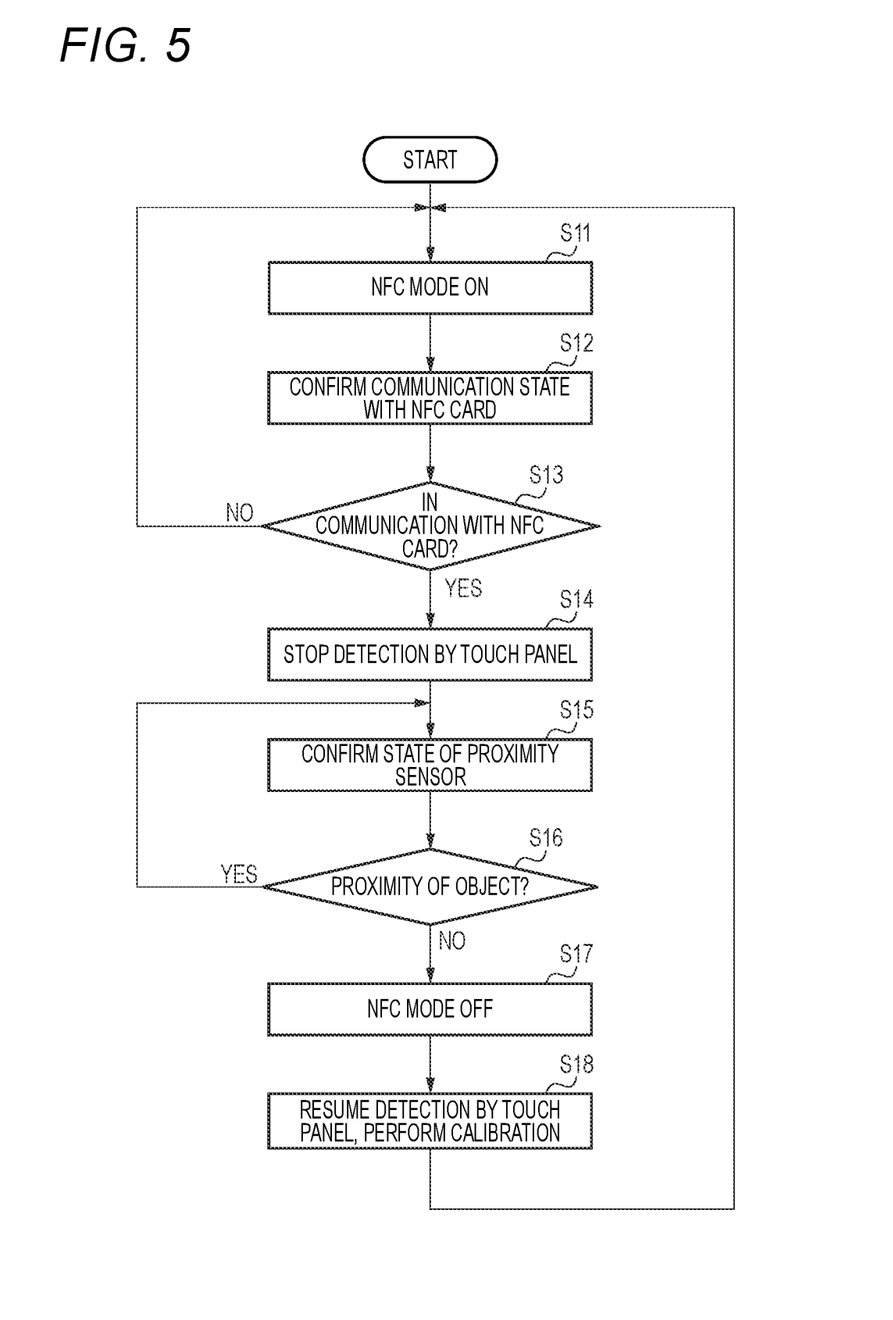
FIG. 5 is a flowchart showing a procedure for executing a first example of a method for controlling an electronic apparatus.

FIG. 5 is a flowchart showing a procedure for executing a first example of a method for controlling the electronic apparatus 100. The control unit 11 executes steps of the control method. For example, the control unit 11 reads a control program of the electronic apparatus 100 stored in the memory 13 and executes the control method.

First, the control unit 11 sets the operation mode of the electronic apparatus 100 to the NFC mode (near field communication mode). That is, the control unit 11 turns on the NFC mode (step S11). When the NFC mode is turned on, polling for near field communication starts, and the NFC antenna 5 transmits radio waves. After setting the operation mode to the NFC mode, the control unit 11 confirms the communication state between the NFC antenna 5 and the NFC card 200 (step S12), and determines whether the NFC antenna 5 is in communication with the NFC card 200 (step S13). For example, in a case that the distance from the NFC antenna 5 to the NFC card 200 is equal to or less than the communicable distance d1, the NFC antenna 5 is communicable with the NFC card 200.

When it is determined that the NFC antenna 5 is in communication with the NFC card 200 (step S13: YES), the control unit 11 stops detection of an indicator by the touch panel 3 (step S14).

The control unit 11 confirms the state of the proximity sensor 6 (step S15), and determines whether an object is in proximity to the electronic apparatus 100 (step S16).

In a case that no proximity of an object is determined (step S16: NO), the control unit 11 determines that the NFC card 200 goes far away from the electronic apparatus 100 and thus the near field communication detected in step S13 ended. In this case, the control unit 11 sets the operation mode of the electronic apparatus 100 to the non-NFC mode. That is, the control unit 11 turns off the NFC mode (step S17). When the NFC mode is turned off, polling for near field communication is stopped. In step S16, no proximity of the object may be determined in a case that proximity of the object is detected by none of the proximity sensors 6. In this case, the control unit 11 can determine, for example, that neither the NFC card 200 nor a finger of the user holding the NFC card 200 is in proximity.

After the processing of step S17, the control unit 11 cancels the stop of the detection of the indicator or the like by the touch panel 3, and resumes the detection. Further, when the touch panel 3 is an electrostatic capacitance touch panel, the control unit 11 resets (calibrates) electrostatic capacitance stored in the touch panel 3 (step S18). In the calibration, the electrostatic capacitance is adjusted to a predetermined value. Then, the control unit 11 turns on the NFC mode again (step S11), and repeats the steps thereafter.

In this way, in the first example of the control method, the electronic apparatus 100 can prevent the malfunction of the touch panel 3 by not performing the detection by the touch panel 3 during the near field communication. In the first example, since the NFC mode is turned off after the near field communication ended, the polling also ends. For this reason, since the detection by the touch panel 3 is resumed in a state that no radio wave is transmitted from the NFC antenna 5, the NFC antenna 5 and the touch panel 3 do not further electrically interfere with each other, and the malfunction of the touch panel 3 can be further prevented.

In a case that the electronic apparatus 100 performs the first example of the control method shown in FIG. 5, the electronic apparatus 100 may include one proximity sensor 6 instead of three proximity sensors 6. This is because, in step S16, it is sufficient to turn off the NFC mode in a case that no proximity of an object is detected without specifying whether the object is the NFC card 200 or an indicator.

Figure 6:
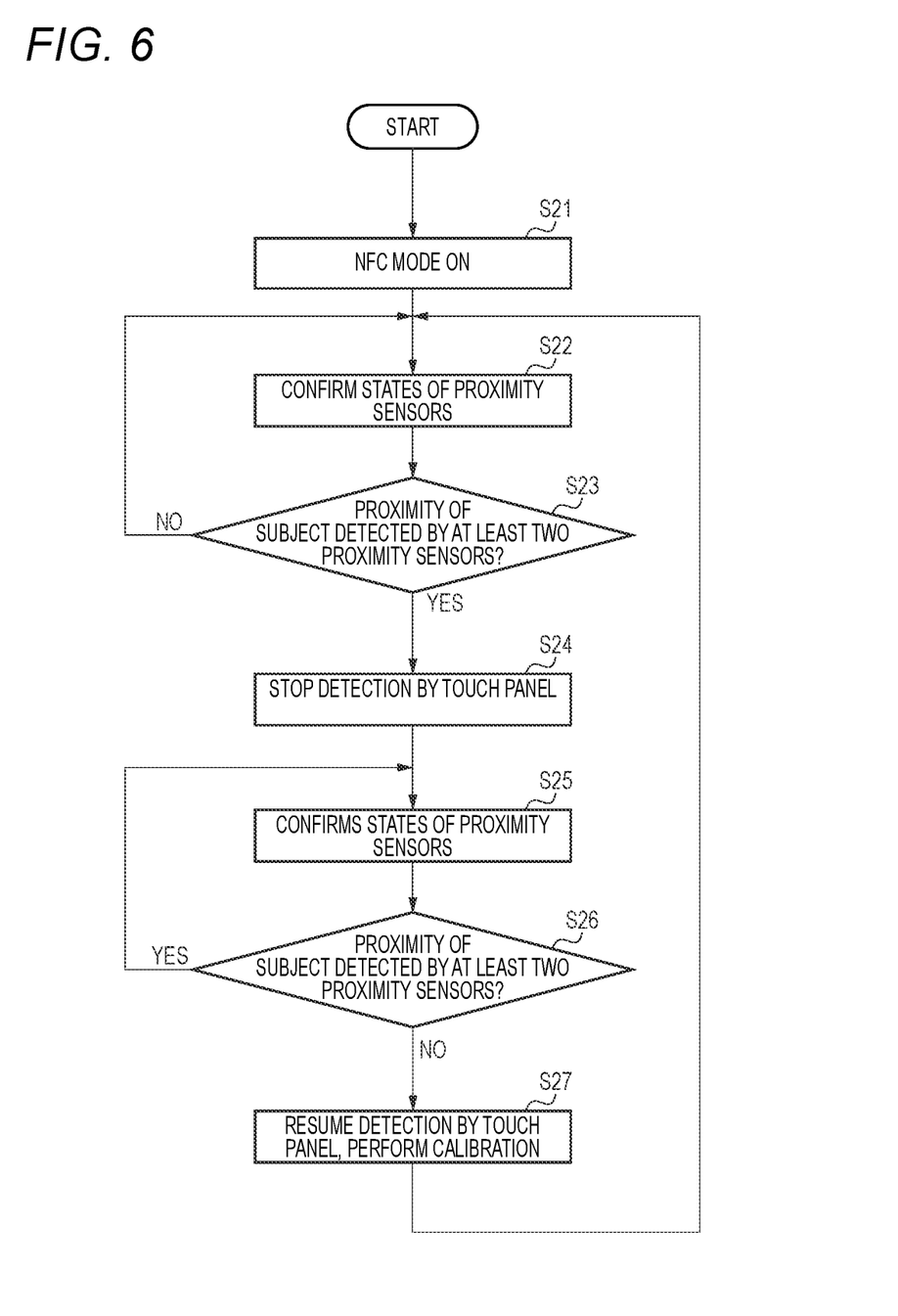
FIG. 6 is a flowchart showing a procedure for executing a second example of the method for controlling an electronic apparatus.

FIG. 6 is a flowchart showing a procedure for executing a second example of the method for controlling the electronic apparatus 100. In this example, the control unit 11 sets in advance the operation mode of the electronic apparatus 100 to the NFC mode in which the NFC antenna 5 transmits radio waves. That is, the control unit 11 turns on the NFC mode (step S21). Unlike the first example, the control unit 11 keeps the NFC mode on in the subsequent steps.

The control unit 11 confirms states of the plurality of proximity sensors 6 (step S22), and determines whether the NFC card 200 is in proximity to the electronic apparatus 100 (step S23). In this case, the control unit 11 determines detection of the NFC card 200 in a case that at least two proximity sensors 6 among the plurality of proximity sensors 6 arranged around the NFC antenna 5 simultaneously detect an object. For example, in a case that the user holds the electronic apparatus 100 with fingers, only one of the proximity sensors 6 may be overlapped. On the other hand, the NFC card 200 may be present in a wider range than the finger of the user, and may overlap, for example, with an upper half of the electronic apparatus 100. In this way, it is possible to determine whether the object is a communication medium or an indicator according to the number of proximity sensors 6 that detected proximity.

When proximity of an object is simultaneously determined by at least two proximity sensors 6 (step S23: YES), the control unit 11 detects proximity of the NFC card 200. In this case, the control unit 11 stops the detection of the indicator by the touch panel 3 (step S24).

Subsequently, the control unit 11 confirms the states of the proximity sensors 6 (step S25), and determines whether an object is in proximity to the electronic apparatus 100 (step S26). In steps S25 and S26, similarly to steps S22 and S23, it is determined whether at least two proximity sensors 6 simultaneously detected an object, and it is determined whether the NFC card 200 is continuously in proximity to the electronic apparatus 100.

If it is determined that no proximity of the object is detected by at least two proximity sensors 6 (step S26: NO), that is, in a case that proximity of the object is detected by one or less proximity sensor 6, it can be determined that no object is in proximity to the electronic apparatus 100, or that an indicator is in proximity to the electronic apparatus 100 and no NFC card 200 is in proximity to the electronic apparatus 100. In this case, the control unit 11 cancels the stop of the detection of the indicator by the touch panel 3 and resumes the detection. Further, in a case that the touch panel 3 is an electrostatic capacitance touch panel, the control unit 11 resets, so-called calibrates the electrostatic capacitance stored in the touch panel 3 (step S28). Then, the control unit 11 repeats the step S22 and the subsequent steps.

In this way, in the second example of the control method, even when the NFC mode is not turned off, the electronic apparatus 100 can determine that the NFC card 200 is far away more than the object detection distance d3 by detecting no object by the proximity sensor 6. Therefore, even when the detection by the touch panel 3 is resumed, the electronic apparatus 100 can prevent malfunction of the touch panel 3 since the NFC card 200 and the NFC antenna 5 are not in near field communication. Since the electronic apparatus 100 does not turn off the NFC mode, the near field communication function can be used at any time by bringing the NFC card 200 close to the electronic apparatus 100.

Figure 7:
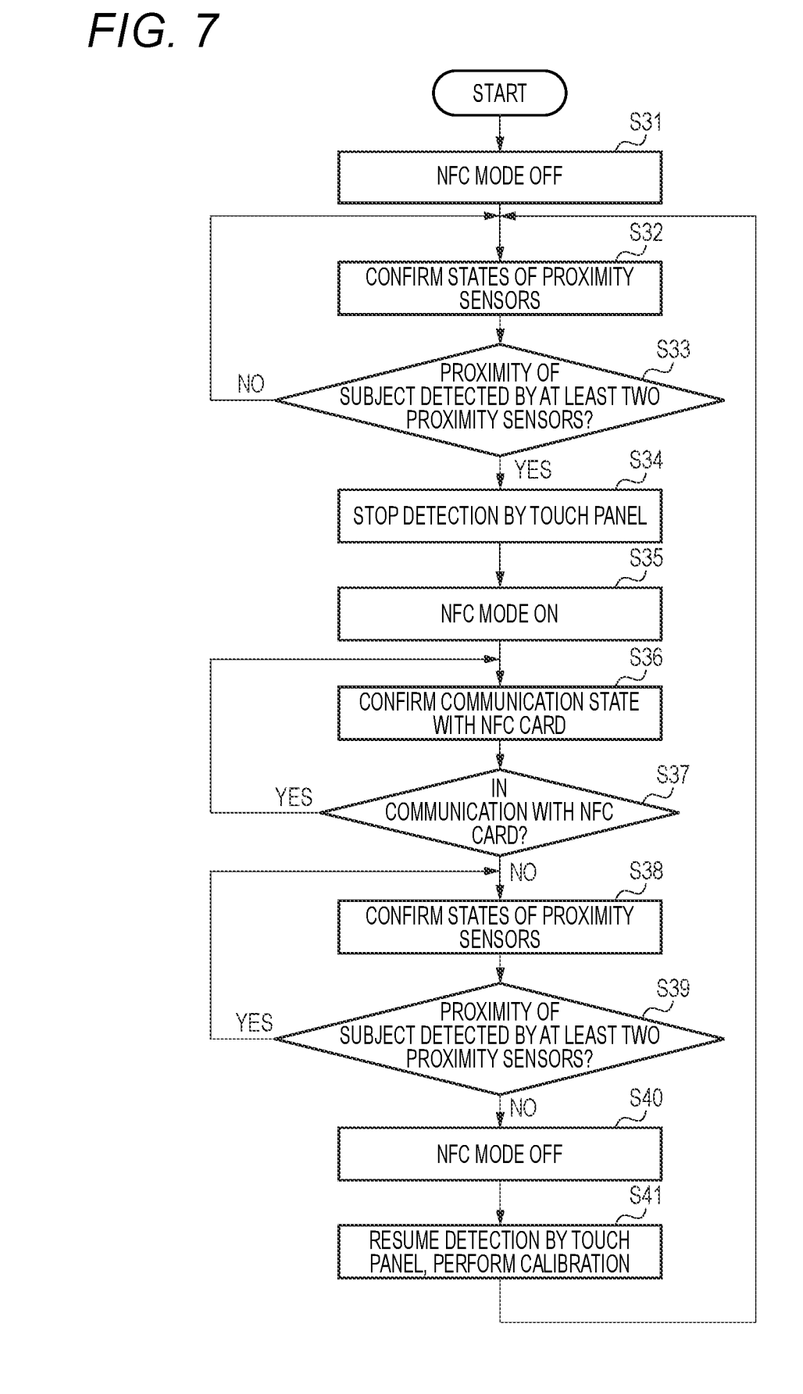
FIG. 7 is a flowchart showing a procedure for executing a third example of the method for controlling an electronic apparatus.

FIG. 7 is a flowchart showing a procedure for executing a third example of the method for controlling the electronic apparatus 100. In this example, the control unit 11 sets the operation mode of the electronic apparatus 100 to the non-NFC mode in advance. That is, the control unit 11 turns off the NFC mode at the start of the processing of FIG. 7 (step S31). Unlike the second example, the control unit 11 switches ON and OFF of the NFC mode in the subsequent steps, as will be described below.

The control unit 11 confirms the states of the proximity sensors 6 (step S32), and determines whether an object is in proximity to the electronic apparatus 100 (step S33). In this case, the control unit 11 determines detection of the NFC card 200 in a case that at least two proximity sensors 6 among the plurality of proximity sensors 6 arranged around the NFC antenna 5 simultaneously detect an object. The method for determining proximity of an object here is the same as the method of step 23 of FIG. 4.

In a case that proximity of an object is simultaneously determined by at least two proximity sensors 6 (step S33: YES), the control unit 11 detects proximity of the NFC card 200. In this case, the control unit 11 stops the detection of the indicator by the touch panel 3 (step S34).

Subsequently, the control unit 11 sets the operation mode of the electronic apparatus 100 to the NFC mode. That is, the control unit 11 turns on the NFC mode (step S35).

After setting the operation mode to the NFC mode, the control unit 11 confirms the communication state between the NFC antenna 5 and the NFC card 200 (step S36), and determines whether the NFC antenna 5 is in communication with the NFC card 200 (step S37).

When it is determined that the NFC antenna 5 is not in communication with the NFC card 200, that is, the near field communication ended (step S37: YES), the control unit 11 confirms the states of the proximity sensors 6 (step S38), and determines whether an object is in proximity to the electronic apparatus 100 (step S39). The method for determining proximity of an object here is the same as the method of step S26 of FIG. 6. That is, the control unit 11 determines whether at least two proximity sensors 6 simultaneously detected an object, and determines whether the NFC card 200 is continuously in proximity to the electronic apparatus 100.

If it is determined that no proximity of the object is detected by at least two proximity sensors 6 (step S39: NO), that is, in a case that proximity of the object is detected by one or less proximity sensor 6, it can be determined that no object is in proximity to the electronic apparatus 100, or that an indicator is in proximity to the electronic apparatus 100. In this case, the control unit 11 sets the operation mode of the electronic apparatus 100 to the non-NFC mode, that is, turns off the NFC mode (step S40). When the NFC mode is turned off, polling for near field communication ends.

Subsequently, the control unit 11 cancels the stop of the detection of the indicator by the touch panel 3, and resumes the detection. Further, in a case that the touch panel 3 is an electrostatic capacitance touch panel, the control unit 11 resets, so-called calibrates the electrostatic capacitance stored in the touch panel 3 (step S41). Then, the control unit 11 repeats the step S32 and the subsequent steps.

In this way, in the third example of the control method, in a case that proximity of an object is simultaneously detected by at least two proximity sensors 6, that is, in a case that proximity of a communication medium such as the NFC card 200 is detected by the proximity sensors 6, the electronic apparatus 100 sets the operation mode of the electronic apparatus 100 to the NFC mode. Therefore, the electronic apparatus 100 can prevent power consumption by not performing polling in a case that no communication medium is detected, automatically turn on near field communication in response to proximity of a communication medium, and improve user convenience.

In any of the first to third examples, the control unit 11 calibrates the electrostatic capacitance touch panel 3 and resets the electrostatic capacitance stored in the touch panel 3 in a state in which proximity of an object is no longer detected by the proximity sensor 6. Therefore, the electronic apparatus 100 can calibrate the touch panel 3 and can reliably reset the electrostatic capacitance with no electrical interference due to the near field communication. Therefore, the electronic apparatus 100 can detect the electrostatic capacitance generated by proximity of an object (for example, indicator) to the touch panel 3 with high accuracy, and can prevent continuation of malfunction of touch panel 3 even after the NFC card 200 goes far away from the NFC antenna 5.

In this way, for example, even when the NFC antenna 5 is disposed on a back surface of the touch panel 3 and the touch panel 3, the LCD module 4, a backlight, and the like are present between the NFC card 200 and the NFC antenna 5, the electronic apparatus 100 according to the present embodiment can prevent the influence of disturbance of a magnetic flux, scan noise, and the like in the near field communication and prevent the malfunction of the touch panel 3.

Further, since the object detection distance d3 is set to be longer than the touch panel interference distance d2, the electronic apparatus 100 can immediately resume the touch panel in a case that the NFC card 200 is far away from the electronic apparatus 100 more than the object detection distance d3 at which the NFC card 200 can be detected by the proximity sensor 6. This is because the NFC card 200 is not present within the touch panel interference distance d2, and the near field communication and the touch panel 3 do not electrically interfere with each other. Further, the detection by the touch panel can be automatically resumed without user operation, thus improving user convenience.

Next, variations of the present embodiment will be described.

The shape and the number of the proximity sensors 6 are not limited to the shape and the number shown in FIG. 1. For example, two L-shaped proximity sensors 6 may be provided around the NFC antenna 5.

Figure 8:
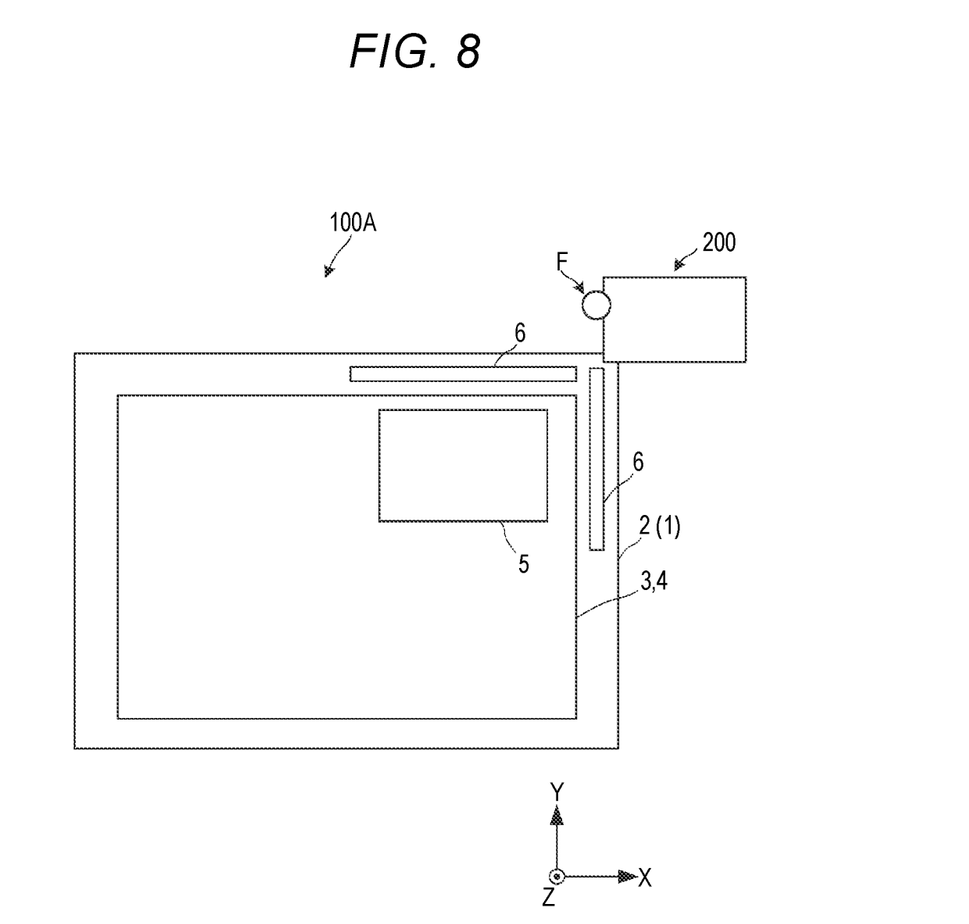
FIG. 8 is an overall configuration view of an electronic apparatus as a tablet terminal including a touch panel.

The electronic apparatus 100 may be a tablet terminal. FIG. 8 is an overall configuration view of an electronic apparatus 100A as a tablet terminal including the touch panel 3. In FIG. 8, the NFC antenna 5 is disposed in a position close to the positive side in the X direction and the positive side in the Y direction of the electronic apparatus 100A, and the two proximity sensors 6 are disposed outside the NFC antenna 5 respectively on the positive side in the X direction and the positive side in the Y direction. Even in this case, it is possible to operate and control the electronic apparatus 100A in the same manner as the electronic apparatus 100 shown in FIG. 1.

As described above, the electronic apparatus 100 according to the present embodiment includes the touch panel 3, the NFC antenna 5 (example of near field communication antenna), the proximity sensor 6 that is provided around the NFC antenna 5 in the vicinity of the touch panel 3 and detects proximity of an object, and the control unit 11. The control unit 11 stops detection by the touch panel 3 in a case that the NFC antenna 5 is in near field communication or in a case that proximity of a communication medium (for example, NFC card 200) capable of communicating with the NFC antenna 5 is detected by the proximity sensor 6.

Accordingly, in a case that there is a possibility that the near field communication may be started between the NFC antenna 5 and the NFC card 200, the electronic apparatus 100 can prevent electrical interference between the near field communication and the detection by the touch panel 3 by stopping the detection operation of the touch panel 3. Therefore, the electronic apparatus 100 can prevent the malfunction of the touch panel 3.

The control unit 11 may cancel the stop of the detection by the touch panel 3 in a case that proximity of the object is no longer detected by the proximity sensor 6.

Accordingly, the electronic apparatus 100 can resume the detection by the touch panel 3 on an assumption that the near field communication ended, and can prevent electrical interference between the near field communication and the detection by the touch panel 3.

The control unit 11 may set the operation mode of the electronic apparatus 100 to the non-NFC mode (non-near field communication mode) in which the NFC antenna 5 does not transmit radio waves in a case that proximity of the object is no longer detected by the proximity sensor 6, and may cancel the stop of the detection by the touch panel 3 after setting the operation mode to the non-NFC mode.

Accordingly, the electronic apparatus 100 can switch the operation mode between the near field communication and the non-near field communication, and can stop polling for the near field communication during the non-near field communication. Therefore, the electronic apparatus 100 can highly accurately prevent the electrical interference between the near field communication and the detection by the touch panel 3 in a state without polling.

The control unit 11 may set the operation mode of the electronic apparatus 100 to the NFC mode in which the NFC antenna 5 transmits radio waves when proximity of the communication medium capable of near field communication with the NFC antenna 5 is detected by the proximity sensor 6.

Accordingly, the electronic apparatus 100 can prevent power consumption by not performing polling by the NFC antenna 5 in a case that no object is detected, and can automatically turn on the near field communication in response to proximity of the NFC card 200 to electronic apparatus 100. For this reason, the electronic apparatus 100 can improve the convenience of the user regarding the use of the near field communication function.

Further, the touch panel interference distance d2, which is a distance at which the near field communication between the NFC antenna 5 and the communication medium electrically interferes with the detection by the touch panel 3, may be longer than the communicable distance d1, which is a distance at which the NFC antenna 5 is capable of near field communication, and may be less than the object detection distance d3, which is a distance at which the proximity sensor 6 can detect an object.

Instead of resuming the detection by the touch panel 3 at the same time as the end of the near field communication, that is, in a case that the distance to the NFC card 200 is longer than the communicable distance d1, for example, the electronic apparatus 100 may cancel the stop of the detection by the touch panel 3 after the NFC card 200 goes farther away from the NFC antenna 5, the distance to the NFC card 200 reaches the object detection distance d3, and an object (in this case, NFC card 200) cannot be detected by the proximity sensor 6. Accordingly, the electronic apparatus 100 can reduce the potential that a communication medium is present within the touch panel interference distance d2, and can more reliably prevent the malfunction of the touch panel 3. Further, in a case that the distance to NFC card 200 is longer than object detection distance d3, the electronic apparatus 100 immediately resumes the detection by the touch panel 3 (cancels the stop of the detection), thereby improving the convenience of the user.

The control unit 11 may reset the electrostatic capacitance stored in the touch panel 3 in a case that proximity of the object is no longer detected by the proximity sensor 6.

Accordingly, the electronic apparatus 100 resets the electrostatic capacitance of the touch panel 3 when the NFC antenna 5 does not transmit or receive radio waves, and thus can reset the electrostatic capacitance with no influence of the near field communication, improving the accuracy of the resetting. Therefore, the detection accuracy of the touch panel 3 using the electrostatic capacitance is improved. Therefore, the electronic apparatus 100 can improve the operation accuracy of the touch panel 3 after the NFC card 200 goes far away from the electronic apparatus 100.

Further, a plurality of proximity sensors 6 may be provided. The control unit 11 may detect proximity of the communication medium in a case that the plurality of proximity sensors 6 simultaneously detect proximity.

Accordingly, the electronic apparatus 100 can determine whether the object in proximity to the proximity sensor 6 is the NFC antenna 5 or an indicator (such as a finger or a stylus pen) to the touch panel 3, and can control the operation of touch panel 3.

Further, three proximity sensors 6 may be provided. The three proximity sensors 6 are disposed along three respective sides of the NFC antenna 5 having a rectangular shape in a plan view.

Accordingly, the electronic apparatus 100 can detect that the NFC card 200 covers, for example, about the upper half of the housing 1 of the small electronic apparatus 100 by the three proximity sensors disposed along the three respective sides.

Although various embodiments are described above with reference to the drawings, it is needless to say that the present disclosure is not limited to such examples. It will be apparent that those skilled in the art can conceive of various modifications and alterations within the scope described in the claims, and it is understood that such modifications and alterations naturally belong to the technical scope of the present disclosure. Further, elements in the above-described embodiments may be freely combined without departing from the gist of the present disclosure.

The present disclosure is applicable to an electronic apparatus, a touch panel control method, and the like that can prevent electrical interference between near field communication and a touch panel and prevent malfunction of the touch panel.

What is claimed is:

1. An electronic apparatus comprising:
   a touch panel with a detection function;
   an antenna for near field communication, the antenna being provided on a back surface of the touch panel;
   a plurality of proximity sensors provided around the antenna and configured to detect a proximity of a communication medium; and
   a processor, wherein
   in a case that at least two proximity sensors, of the plurality of proximity sensors, simultaneously detect the proximity of the communication medium for communicating with the antenna, the processor sets an operating mode of the electronics apparatus to a near field communication mode for wireless transmission by the antenna and stops the detection function of the touch panel.

2. The electronic apparatus according to claim 1, wherein in a case that the at least two proximity sensors no longer detect the proximity of the communication medium, the processor cancels a stop of the detection function of the touch panel.

3. The electronic apparatus according to claim 2, wherein in a case that the at least two proximity sensors no longer detect the proximity of the communication medium, the processor sets the operating mode of the electronics apparatus to a non-near field communication mode in which the antenna does not conduct the wireless transmission and cancels the stop of the detection function of the touch panel.

4. The electronic apparatus according to claim 3, wherein a touch panel interference distance, which is a distance at which near field communication between the antenna and the communication medium electrically interferes with the detection function of the touch panel, is longer than a communicable distance at which the near field communication is communicable with the antenna, and is shorter than an object detection distance at which the near field communication is communicable with the proximity sensor.

5. The electronic apparatus according to claim 3, wherein in a case that the at least two proximity sensors no longer detect the proximity of the communication medium, the processor resets electrostatic capacitance stored in the touch panel.

6. The electronic apparatus according to claim 1, wherein in a case that one or less proximity sensor, of the plurality of proximity sensors, detects a proximity of an object, the processor does not stop the detection function of the touch panel.

7. The electronic apparatus according to claim 1, wherein the plurality of proximity sensors are provided outside and around the touch panel.

8. A method of controlling an electronic apparatus including a touch panel with a detection function, an antenna for near field communication provided on a back surface of the touch panel, a plurality of proximity sensors provided around the antenna and configured to detect a proximity of a communication medium, and a processor, the method comprising:
   setting an operating mode of the electronics apparatus to a near field communication mode for wireless transmission by the antenna in a case that at least two proximity sensors, of the plurality of proximity sensors, simultaneously detect the proximity of the communication medium for communicating with the antenna; and
   stopping the detection function of the touch panel in a case that the near field communication mode is set.

9. The electronic apparatus according to claim 1, wherein the antenna has a rectangular shape in a plan view, and the plurality of proximity sensors are provided along three sides of the antenna.

* * * * *